United States Patent
Schoeberl et al.

(10) Patent No.: US 9,827,930 B2
(45) Date of Patent: Nov. 28, 2017

(54) VEHICLE ELECTRICAL SYSTEM ARCHITECTURE

(71) Applicant: Bayerische Motoren Werke Aktiengesellschaft, Munich (DE)

(72) Inventors: Eduard Schoeberl, Schwabhausen (AT); Martin Kaltenbrunner, Taufkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 280 days.

(21) Appl. No.: 14/695,571

(22) Filed: Apr. 24, 2015

(65) Prior Publication Data

US 2015/0224948 A1  Aug. 13, 2015

(30) Foreign Application Priority Data

Oct. 25, 2012 (DE) .................. 10 2012 219 560

(51) Int. Cl.
  *B60R 22/00* (2006.01)
  *B60R 16/033* (2006.01)
  *F02N 11/08* (2006.01)
  *H02J 7/14* (2006.01)

(52) U.S. Cl.
  CPC ........ *B60R 16/033* (2013.01); *F02N 11/0862* (2013.01); *H02J 7/1438* (2013.01); *Y02T 10/7005* (2013.01)

(58) Field of Classification Search
  CPC .. B60R 16/033; F02N 11/0862; H02J 7/1438; Y02T 10/7005

USPC ....... 307/10.6, 10.7, 10.1, 9.1; 320/103–105, 320/166

See application file for complete search history.

(56) References Cited

U.S. PATENT DOCUMENTS

| 6,018,201 A | 1/2000 | Mauney et al. |
| 6,304,054 B1 | 10/2001 | Granberg et al. |
| 2007/0252559 A1 | 11/2007 | Uhl |
| 2008/0252148 A1* | 10/2008 | Pursifull ................ B60R 16/03 307/81 |
| 2013/0314024 A1 | 11/2013 | Proebstle et al. |

FOREIGN PATENT DOCUMENTS

| DE | 40 28 242 A1 | 3/1992 |
| DE | 699 35 831 T2 | 8/2007 |
| DE | 10 2007 029 479 A1 | 1/2009 |

(Continued)

OTHER PUBLICATIONS

International Search Report dated Mar. 5, 2014 (Two (2) pages).
German Search Report dated May 17, 2013 with Statement of Relevancy (Five (5) pages).

*Primary Examiner* — Thomas Skibinski
(74) *Attorney, Agent, or Firm* — Crowell & Moring LLP

(57) ABSTRACT

The invention relates to a vehicle comprising an internal combustion engine and a vehicle electrical system, which comprises a battery, a current distributor, a starter, a generator, and electrical loads, in such a way that the vehicle comprises a first supply line, the first supply line connects the current distributor to a starter terminal or to the starter, the vehicle comprises a second supply line, the second supply line connects the current distributor to a support point, and the electrical loads and the generator are electrically connected to the support point.

5 Claims, 1 Drawing Sheet

(56) References Cited

FOREIGN PATENT DOCUMENTS

| | | |
|---|---|---|
| DE | 10 2008 061 955 A1 | 9/2009 |
| DE | 10 2008 032 138 A1 | 1/2010 |
| DE | 10 2008 054 706 A1 | 6/2010 |
| DE | 10 2009 058 362 A1 | 6/2011 |
| DE | 10 2011 003 565 A1 | 8/2012 |
| EP | 1 564 862 A1 | 8/2005 |
| EP | 2 469 070 A1 | 6/2012 |

* cited by examiner

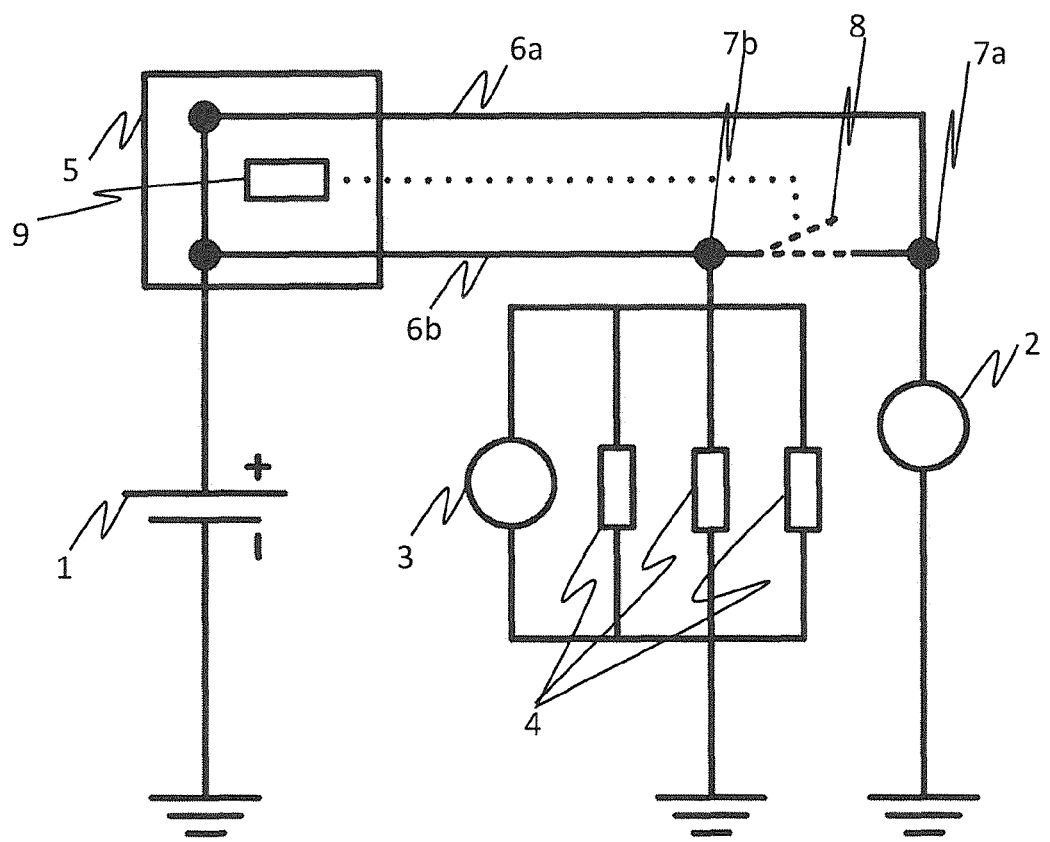

VEHICLE ELECTRICAL SYSTEM ARCHITECTURE

CROSS REFERENCE TO RELATED APPLICATIONS

This application is a continuation of PCT International Application No. PCT/EP2013/072164, filed Oct. 23, 2013, which claims priority under 35 U.S.C. §119 from German Patent Application No. 10 2012 219 560.2, filed Oct. 25, 2012, the entire disclosures of which are herein expressly incorporated by reference.

BACKGROUND AND SUMMARY OF THE INVENTION

The invention relates to a vehicle comprising an internal combustion engine and vehicle electrical system, which comprises a battery, a current distributor, a starter, a generator and electrical loads.

The electrical system of a motor vehicle supplies to a multiplicity of electrical components. The electrical power is provided by a battery of the vehicle electrical system and/or by a generator. In modern vehicles, an increasing number of electrical loads is implemented as high current loads. This makes special requirements on the stability of the voltage in the vehicle electrical system since high current consumption reduces the voltage output by the battery and/or the generator. In particular the starter as a high current load with peak values up to more than 600 A is more frequently used in modern vehicles comprising an automatic engine-start-stop function than in a conventional vehicle.

The high current consumption of the starter results in measures described in the prior art for supporting the voltage in the vehicle electrical system, which compensate the voltage dip in the vehicle electrical system. This relates, for example, to the integration of a series resistor for limiting the starter current according to EP 2 469 070 A1, or to the parallel connection of additional voltage sources such as super capacitors according to EP 1 564 862 A1.

It is an object of the invention to describe an improved vehicle comprising an internal combustion engine and comprising a vehicle electrical system, which comprises a battery, a current distributor, a starter, a generator and electrical loads.

This object is achieved by a vehicle according to the independent claims. Advantageous embodiments and refinements of the invention arise from the dependent claims.

According to the invention, the vehicle comprises a first supply line which connects the current distributor to a starter terminal, and the vehicle comprises a second supply line which connects the current distributor to a support point, wherein the electrical loads and the generator are electrically connected to the support point Accordingly, there are two supply lines in the vehicle for distributing the electrical potential of the battery to the components in the vehicle electrical system. The starter is connected to one of the lines, and the generator and the electrical loads are connected to the other one of the two lines. Through this, a voltage-stabilizing vehicle electrical system architecture is provided.

According to a preferred embodiment of the invention, the vehicle comprises a switch that is located between the support point and the starter terminal, and a control unit that controls the switch. The switch is configured as a break contact.

Thus, in a default setting of the switch position, the switch connects the support point and the starter terminal to one another. The support point can be provided with load circuits for electrical loads of the vehicle, which load circuits are connected via fuses.

Furthermore, it is advantageous if the vehicle comprises at least one control device, if a status signal for requesting a start can be transmitted at least unidirectionally to the control device via a data connection, and if the control device sends a control signal for opening the switch to the control unit upon a start request.

The control device and the control unit thus are participants in a data transmission system of the vehicle. For example, in the case of a vehicle comprising an automatic engine-start-stop function, a status signal for requesting a start can be transmitted to the control device during an engine stop by actuating a clutch pedal.

According to a preferred variant of the invention, the control unit opens the switch prior to a start of the engine and closes the switch after a start of the engine.

In particular during the start and at the time of maximum current consumption of the starter, the support point and the starter terminal are separated with regard to their potential level. The start current flowing during an engine start for electrically supplying the starter thus flows through the supply line connecting the starter terminal separately from the supply line connecting the support point and therefore does not reduce the potential at the support point.

Another advantage is obtained if the data transmission system is configured as a LIN bus and if the control unit is configured as a LIN module comprising a processor and a driver. A LIN bus is a cost-effective and robust data transmission system.

Furthermore, the support point can be utilized as a jump start support point for external power supply to the vehicle.

The invention is based on the considerations set out below. The vehicle electrical system of a motor vehicle usually comprises a battery, a high-current fuse distribution box, a generator, a starter for an internal combustion engine and lines for connecting these components, as well as terminals for further electrical loads.

In particular when integrating an automatic engine-star-stop function, different measures for avoiding undervoltages at loads, for example control devices, are implemented in this vehicle electrical system architecture. This can involve connecting an additionally integrated battery for stabilization of the vehicle electrical system. The disadvantage of such a stabilization measure is that it constitutes a cost-intensive and installation-space-consuming solution and requires an operating strategy for the additional energy storage and the switch unit.

Proposed is a vehicle electrical system architecture which, in contrast, exhibits less complexity and higher robustness. The electrical potential is provided in the DC voltage vehicle electrical system via two separate electrically parallel lines. In particular the starter is supplied through a separate starter line. As a result, the voltage dropping at the starter line does not affect the parallel second line.

In addition, a switching element is integrated in the vehicle electrical system through which the potential at the starter can be connected to the potential at a load support point at which the generator is also interconnected. Thus, the electric resistance is halved and the battery can be charged with less electrical power loss. The switching element is switched using a module, preferably a LIN module, which is integrated in the vehicle bus system.

A preferred exemplary embodiment of the invention is described below with reference to the attached drawing. Further details, preferred embodiments and refinements of the invention become apparent therefrom. In particular and schematically, Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 shows a vehicle electrical system architecture.

DETAILED DESCRIPTION OF THE DRAWINGS

FIG. 1 shows a detail of a vehicle electrical system of a motor vehicle comprising an electrical energy storage (1). Without limiting the generality, the latter is configured as an electrochemical storage, e.g., as a lead-acid battery.

The vehicle electrical system further includes a starter (2) for an internal combustion engine. A generator (3) is also mechanically connected to the internal combustion engine, which generator supplies electric power to vehicle electrical system components, in particular to selected electrical loads (4) such as control devices or actuators and sensors, and provides charging current for the battery.

The battery is associated with a current distributor (5) through which the potential of the battery is distributed to ground in the vehicle. In particular, at least two parallel lines are integrated in the vehicle. A first supply line (6a) runs from the current distributor to a first terminal (7a). It is possible that exclusively the starter is connected to this terminal. This terminal is designated as starter terminal.

A second supply line (6b) runs parallel to the first supply line from the current distributor to a second terminal (7b). This terminal is designated as support point. The generator and the electrical loads are connected at this support point.

The support point and the starter terminal can be electrically connected to one another via a switching element (8). The switching element is switched by a switch unit which, without limiting the generality, is integral part of the current distributor.

In terms of function, the switching element is preferably configured as a break contact so that in the rest position, the electrical connection is established without use of energy. However, complementary switching using a make contact instead of a break contact is also conceivable. However, in both cases, the support point and the starter terminal are electrically connected to one another by default.

In this embodiment, the switching element is constructed as a bistable relay. A monostable break contact or quasi diodes can be used as alternative switching elements. A quasi diode is composed of two field-effect transistors and exhibits diode characteristics with very low resistance in the flow direction.

Furthermore, the considerations are based on a relay that is switched by the switch unit (9). The switch unit is configured as a module, i.e., the switch unit comprises a processor and a driver. The processor determines the relay's switching state to be provided. The driver outputs the corresponding switching signal.

The module is integrated in a bus system of the vehicle, e.g., in the communication system LIN or CAN. Relevant information for determining the switching state is transmitted to the processor via said LIN/CAN communication. The processor is configured to have a 16-bit word length and a clock rate of 20 MHz.

During vehicle operation with the internal combustion engine running, the break contact relay is closed. This has the advantage that in the case of charging current provided by the generator, the on-board electrical system battery is charged via the first supply line and the second supply line. As a result, electrical line resistance—compared to charging only via the second supply line—is reduced due to an increased line cross-section, and the electric power loss is reduced.

When starting the internal combustion engine, i.e., when actuating the starter for a cold start or during a warm start during vehicle operation with an engine-start-stop function, the switch unit opens the relay.

The high currents occurring during a starting process cause a voltage dip at the battery. This effect increases with the length of the first supply line (i.e. starter line) and plays no relevant role in particular in vehicles having a battery mounted in the rear of the vehicle. With currents of more than 600 A occurring during engine start and a line length of 6 m (e.g. aluminum having a cross-section of 80 mm$^2$ and a resistivity of 0.368 mΩ/m), the voltage drop at the line can be approximately 1.32 V. This voltage drop at the starter line results in a lower potential at the starter terminal. Compared with the potential at the current distributor, the potential at the starter terminal is decreased by the voltage drop at the starter line. At the current distributor, which ideally is directly connected to the poles of the battery, the voltage dips by the voltage drop at the internal resistance of the battery due to the high-current discharge caused by the starting process. An additional voltage drop at the second supply line and accordingly a further reduction of the potential at the support point depends on the amperage in the second supply line. At an assumed load current of, for example, 60 A, the potential of the support point with the relay open is approximately 1.18 V higher than the potential at the starter terminal at a start current of 600 A, assumed that both supply lines have the same properties.

In the case of a vehicle electrical system having a nominal voltage level of 12 Volt, for example, control devices or other electrical loads require a minimum voltage level for an operation as intended. Without limiting the generality, such a minimum voltage level can be 9 Volt. In the case of a lead-acid battery having a nominal voltage of 12 V and a voltage level of 13-14 Volt, and at a start voltage dip (mainly caused by the internal resistance of the battery) by approximately 4 Volt down to approximately 9-10 Volt, it is apparent that a further voltage drop at the line by 1 Volt can result in an unstable voltage situation in the vehicle electrical system with respect to some of the loads. The integration of a second separate supply line thus provides for voltage stabilization without using expensive complex components such as a direct current regulator or an additional energy storage in addition to the battery. If starter supply lines and support point supply lines are electrically connected by means of a break contact, the lower total line resistance results in reduced electrical power loss during battery charging operation as well as during operation under load.

Opening the relay by the switch unit is carried out by the module based on the bus messages transmitted to the module. For example, if a request for a warm start is sent to the starter, this start signal is also transmitted to the module. A warm start is a start of the engine after an automatic stop of the engine with the terminal 15 activated within the running vehicle operation with an automatic start-stop function. For example, if the actuation of the clutch pedal by the vehicle user issues the request for an engine start, the central engine electronics transmits a start signal to the starter and to the module.

The module opens the relay for the period of the starting process. For a modern internal combustion engine and a battery in average healthy condition—known to the person skilled in the art addressed here as state-of-health—and in sufficiently charged condition—known to the person skilled in the art as state-of-charge—the starting process takes no longer than approximately 1 second.

Closing the relay, i.e., switching back to the default state is carried out by the module, e.g. upon reaching a minimum speed of the engine, wherein the engine electronics transmits the speed of the engine to the module. As an alternative, closing can take place after a predetermined period after opening, wherein this period is selected such that under normal circumstances, the duration of the starting process is shorter than said predetermined period. In addition, due to the integration of the current distributor located at the battery, the module can determine the voltage at the battery by measuring the potential at the battery, and closes the switch only upon exceeding a fixed predetermined minimum voltage. Closing the relay at this minimum voltage ensures stable voltage supply to the loads (4) even during the starting process.

As another advantage, the relay closed by default provides for chargeability of the battery through the generator via the two supply lines. This means lower line losses due to less line resistance compared with architectures having only one supply line between battery, generator and starter. Said lower line losses result in the fact that the battery is charged at a reduced power requirement for the generator, which entails lower fuel consumption and reduced $CO_2$ emission. At an assumed battery charging current I of 50 A, the above-mentioned example of a simple aluminum line with a length of L=6 m and a cross-section of 80 mm$^2$ and a resistivity of R=0.368 mΩ/m results in a line loss at the line P according to $P=R \cdot L \cdot I^2$ in the order of magnitude of 5 Watt. This value can be reduced by another supply line and would be halved by another similar line, for example.

The exemplary embodiment can be analogously applied to vehicle electric systems comprising a plurality of batteries.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle comprising an internal combustion engine and comprising a vehicle electrical system which comprises a battery, a current distributor, a starter, a generator and electrical loads, wherein the vehicle comprises:
    a first supply line connecting the current distributor to a starter terminal or to a starter;
    a second supply line connecting the current distributor to a support point, and wherein the electrical loads and the generator are electrically connected to the support point;
    a switch located between the support point and the starter terminal;
    a control unit for controlling the switch, wherein the switch is configured as a break contact; and
    a control device, wherein
        a status signal for requesting a start can be transmitted at least unidirectionally to the control device via a data connection, and
        upon a start request, the control device transmits a control signal for opening the switch to the control unit.

2. The vehicle according to claim 1,
wherein
the control unit is configured to open the switch prior to a start of the engine, and
the control unit is configured to close the switch after a start of the engine.

3. The vehicle according to claim 2, wherein
the data connection between the at least one control device and the control unit is configured as a LIN bus, and
the control unit is configured to be provided with a processor and a driver.

4. The vehicle according to claim 1, wherein the support point is configured to be utilized as jump start support point.

5. The vehicle according to claim 1, wherein the control unit is comprised by the current distributor.

* * * * *